United States Patent [19]

Landry

[11] Patent Number: 4,655,492
[45] Date of Patent: Apr. 7, 1987

[54] HIGH PRESSURE HOSE GRIPPER

[76] Inventor: Gary L. Landry, 819 - 18th St., Lake Charles, La. 70601

[21] Appl. No.: 787,629

[22] Filed: Oct. 15, 1985

[51] Int. Cl.⁴ .............................................. B65G 7/12
[52] U.S. Cl. ....................................... 294/15; 294/92
[58] Field of Search ...................... 294/15, 18, 1.1, 92, 294/16, 19.1; 401/137, 139; 239/532; 15/105, 236 R

[56] References Cited

U.S. PATENT DOCUMENTS

| | | | |
|---|---|---|---|
| 735,799 | 8/1903 | McGill | 294/15 |
| 1,686,115 | 10/1928 | Anderson | 294/15 |
| 2,097,683 | 11/1937 | Armstrong | 294/92 |
| 2,671,684 | 3/1954 | Giroux | 294/18 |

Primary Examiner—James B. Marbert
Attorney, Agent, or Firm—Pravel, Gambrell, Hewitt & Kimball

[57] ABSTRACT

An improved hose gripping tool is provided for use with high pressure hoses such as fire hoses. The apparatus includes a saddle which has offset opposed curved jaws that can abut a section of hose on opposite sides, 180° apart. A handle connected to the device allows an operator, such as a fireman, to grip the apparatus. The apparatus reduces the possibility of inadvertent slippage, lessens the strain of supporting the hose and reduces exhaustion commonly experienced by firemen over a long period of time during fire-fighting with such hoses.

10 Claims, 5 Drawing Figures

U.S. Patent  Apr. 7, 1987  4,655,492
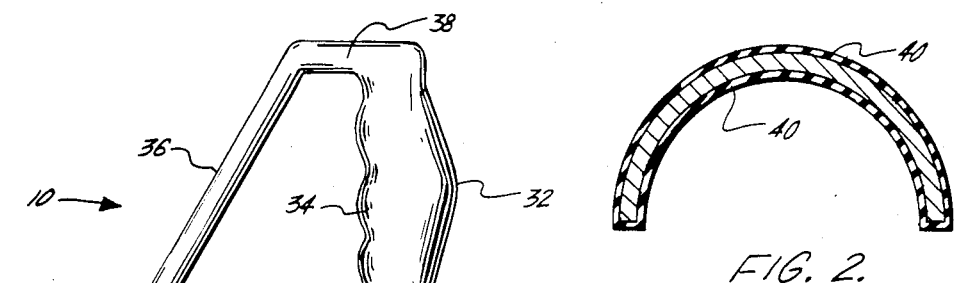
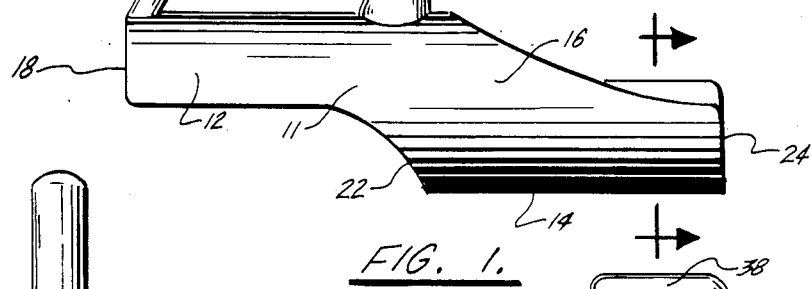
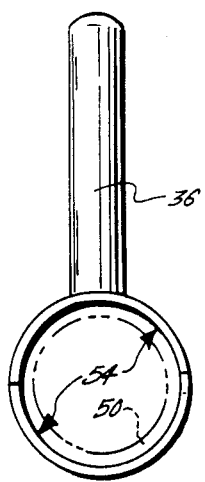
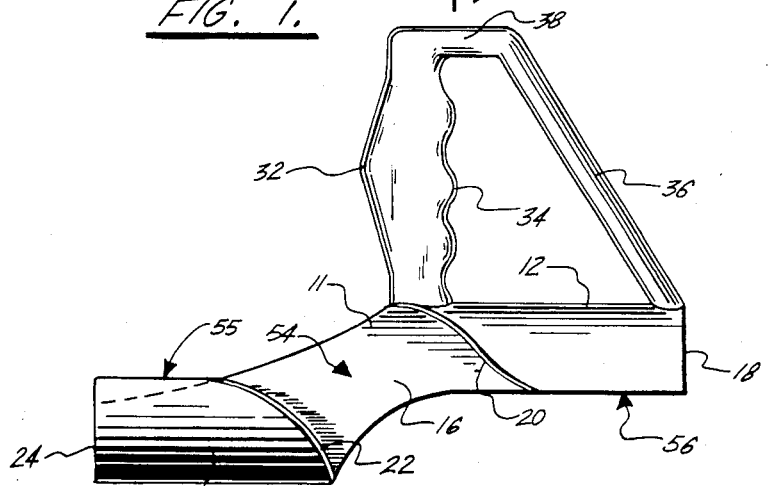
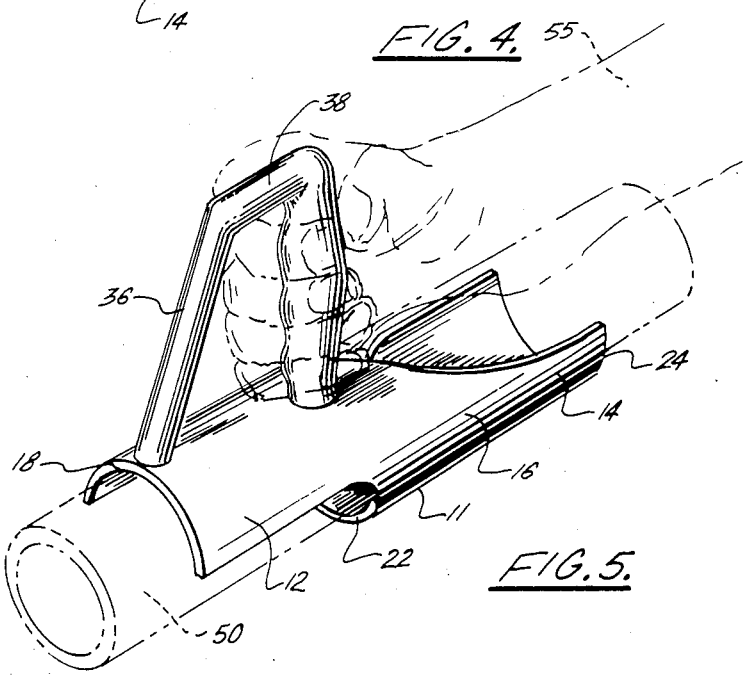

HIGH PRESSURE HOSE GRIPPER

BACKGROUND OF THE INVENTION

1. Field of the Invention

The present invention relates to devices for supporting and controlling the nozzle end of a high pressure hose such as a fire hose while in use. The present invention more particularly relates to a fire hose gripper which engages a section of hose traditionally held by a second backup fireman that is positioned directly behind a first "nozzleman" on a fire hose.

2. General Background

High pressure water hoses such as fire hoses are difficult to handle. The tremendous volume of water flowing through the hose at a high velocity creates a back pressure that must be overcome in order to support the hose and control the direction of water streaming from the nozzle.

In the fighting of fires, three firemen are traditionally assigned to handle the hose. There is a first "nozzleman" who controls the direction of the nozzle and two firemen who stand behind the nozzleman and attempt to control the hose. The fireman directly behind the nozzleman usually receives the brunt of the back pressure load. He must grip the hose with both hands and lean forward to counter the back pressure and support the hose. He often experiences difficulty in maintaining a sure grip. The size of the hose, usually one and a half (1½) to two and a half (2½) inches in diameter, makes the hose difficult to hold securely. Additionally, the hose is usually wet and slippery, adding to the problem of adequate support during fire fighting. The constant movement of the hose requires the fireman to readjust his grip continually. The strain of handling the hose over a long period of time can be physically exhausting.

There are several devices for handling water hoses which have been patented. For example, U.S. Pat. No. 730,119 issued to C. Hanson et al shows a hose spanner used by firemen to carry a hose from place to place. The device comprises a horizontally extending bar to which is attached a handle on its upper surface and two transversely extending reverse hooks. The reverse hooks curve downwardly from the bar to engage a section of hose. The combination of the bar and reverse hooks neither defines a common cylindrical section having an internal diameter substantially equal to the outer diameter of the hose, nor a continuous, spirally but uninterrupted inner cylindrical surface that completely abuts a hose in either a pressurized or an unpressurized state.

U.S. Pat. No. 3,334,859 issued to K. A. Sumida, et al is a device for directing the spray of low pressure hoses such as lawn and garden hoses. The device has a T-shaped yoke which engages the hose and a stand with feet which secures the device to the ground. The yoke has three tongues spaced apart from one another through which the hose is inserted. Two of the tongues engage the lower surface of the hose. The third tongue is centered between the other two tongues and engages the upper surface of the hose. The position of the tongues causes the hose to bow thereby canting the nozzle end of the hose upward. The yoke does not have the configuration of a saddle comprising first and second opposed jaws laterally spaced apart from one another and interconnected by a transitional, center offset section. Nor does the device shown in Sumida et al have a handle which would allow an operator to hold the device.

U.S. Pat. No. 2,919,071 issued to M. J. Dalton is a hose and nozzle attachment designed to connect to the nozzle end of a firehose so that the nozzleman can control the direction of spray. The device has three cylindrical rings spaced apart from one another affixed to a longitudinal member through which an unpressurized hose can be inserted. The ring on the forward end of the device is threaded to receive the threaded male connector on the nozzle end of the hose. The device cannot be connected to a pressurized hose because of this threaded connection.

U.S. Pat. No. 666,474 issued to G. P. DeWolf is a clamp designed to carry a hose from place to place. The device is composed of semi-circular, opposed clamping plates which are connected to two transversely extending handles. Once the clamping plates have engaged a section of hose the plates are secured to one another by a spring. An operator can move the hose from place to place by grasping either the handles which extend beyond the outer diameter of the hose or a strap which bridges the upper surface of the handles. The handles extending beyond the outer diameter of hose make the device difficult to maneuver in close quarters.

U.S. Pat. No. 601,639 issued to P. J. Doyle is a device having two semi-circular, opposed clamp-jaws which are hinged together and snap around a fire hose so that it can be carried from place to place. This device requires specially grooved hoses to receive the clamp-jaws. Like the DeWolf patent, it has handles which extend beyond the outer diameter of the hose so that the device is difficult to maneuver in close quarters.

U.S. Pat. No. 1,933,919 issued to D. McPherson is a device designed for controlling and directing the spray of a pressurized fire hose. The device has a substantially U-shaped frame that is positioned on the upper side of a hose in order to cant nozzle end of the hose upward. The U-shaped frame is affixed to the hose by a rearwardly extending hook and various straps and clamps spaced apart from one another at intervals along the longitudinal axis of the frame. The combination of the frame, hook, straps and clamps do not form a saddle which has a common cylindrical section having an internal diameter substantially equal to the outer diameter of a hose so that there is defined a continuous, uninterrupted cylindrical surface that completely surrounds the hose. The device was not designed to be held by a fireman since it does not in fact have a handle. Nor is the device designed for movement from place to place as it has a pointed foot that is driven into the ground to maintain it in a stationary position several feet behind the nozzle end of the hose.

U.S. Pat. No. 1,616,115 issued to W. Anderson is a handle designed for carrying low pressure hoses such as lawn and garden hoses. The handle has two flexible bands at either end of its longitudinal axis. The handle is affixed to a hose by encircling the hose with the bands and locking the bands in place by latches. The combination of the handle and bands does not show a saddle having an offset center section between opposed curved jaws that can abut a section of hose on opposite sides, 180° apart.

U.S. Pat. No. 955,342 issued to W. H. Maxwell is a hanging sprayer support for low pressure hoses such as shower hoses. The device has a semi-circular configuration having a peripheral groove for receiving a hose. At its midsection the device has a perforated ear extending perpendicular to the peripheral groove. The ear may be attached to a pulley so that the shower hoses ban be raised or lowered. The device does not show a saddle having offset opposed curved jaws that can abut a section of hose on opposite sides. Nor does the device show a handle that can be used by an operator to control the direction of spray.

GENERAL DISCUSSION OF THE PRESENT INVENTION

The preferred embodiment of the apparatus of the present invention provides a quick release hose gripper handle for use with high pressure hoses such as fire hoses. It is a device comprising generally a saddle and a handle.

The saddle comprises first and second opposed jaws which are laterally spaced apart from one another and interconnected by an offset center section. The offset section is curved and spirals downwardly between the first jaw and the second jaw.

The first and second jaws are of a semi-circular configuration in order to register with and contact the top and bottom of the hose. The first jaw curves downwardly from top to bottom and the second jaw curved upwardly from bottom to top so that each jaw is integral with the curved center section. In the preferred embodiment of the present invention, the leading end of the first jaw and the trailing end of the second jaw have a substantially semi-circular configuration while the trailing end of the first jaw and the leading end of the second jaw have an s-curve configuration.

The handle in the preferred embodiment of the present invention has a palm swell and finger rests which conform to the contours of the human hand. These features are designed to allow the operator to obtain a sure grip. The handle also has connected to it a forwardly extending hand guard which is designed to prevent inadvertent slippage of the gripper during use. The handle and hand guard are affixed to the saddle in such a manner that the handle does not extend beyond the outer diameter of the saddle so that an operator can use the gripper in close quarters. Additionally, in the preferred embodiment of the present invention, the handle and hand guard are affixed to the outer surface of the first jaw so that the operator can grip the handle in his hand while resting his forearm on the surface of the hose in order to exert downward pressure with his forearm to counter effectively the back pressure load of a hose in a pressurized state.

The hose gripper of the present invention can be made of a lightweight, but structural material such as aluminum, and is encapsulated with a slip-resistant material such as neophrene rubber. The aluminum can for example be cast so that the saddle, handle and hand guard are of unitary construction. The neophrene can be easily molded to the desired shape. The slip-resistant material not only securely engages the hose to reduce the inadvertent slippage of the hose through the hose gripper, but also reduces the likelihood of the handle slipping through the operator's glove during use. The slip-resistant material, along with the design of the device, also assures the operator that once the hose gripper is engaged, it will not slip off the hose while the hose is pressurized.

The object of this invention is thus to provide a new and improved hand held hose gripper which provides greater stability and fit during use.

A further object of the invention is to provide quick release hose gripper that is easily and quickly engaged with or disengaged from a high pressure hose in either a pressurized or unpressurized state.

A further object of the invention is to provide an improved hose gripper which can be held securely by an operator such as a fireman during extended use without excessive fatigue.

A further object of the present invention is to provide a high pressure hose gripper that will not inadvertently disengage from the hose when the hose is in a pressurized state.

A further object of the present invention is to provide a high pressure hose gripper which allows the fireman directly behind the nozzleman to control a pressurized hose without the assistance of an additional hose handler.

A further object of the present invention is to provide a high pressure hose gripper that will increase the fireman's control of the pressurized hose in order that the nozzleman may direct the stream of water with greater accuracy and make nozzle adjustments with greater ease.

A further object of the present invention is to provide a high pressure hose gripper of compact design that can be easily maneuvered in close quarters.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is a left side view of the hose gripper of the present invention;

FIG. 2 is a sectional view taken along line 2—2 of FIG. 1;

FIG. 3 is a front end view of the hose gripper of the present invention;

FIG. 4 is a right side view of the hose gripper of the present invention; and

FIG. 5 is a perspective view of the hose gripper of the present invention.

DETAILED DESCRIPTION OF THE PREFERRED EMBODIMENT

FIGS. 1, 4 and 5 illustrate best the preferred embodiment of the apparatus of the present invention, generally designated as numeral 10. Hose gripper 10 comprises generally curved saddle 11 and handle 30.

Saddle 11 includes first and second opposed jaws 12 and 14 which are laterally spaced apart from one another and innerconnected by a transitional, central offset, section 16. Offset 16 curves downwardly from trailing end 20 of first jaw 12 to leading end 22 of second jaw 14.

First and second jaws 12 and 14 are of a substantially semicircular configuration in section in order to abut and grip hose 50. First jaw 12 curves downwardly from top to bottom and second jaw 14 curves upwardly from bottom to top. (See FIG. 4)

In the preferred embodiment of the present invention, leading end 18 of first curved jaw section 12 and trailing end 24 of second curved jaw section 14 have a substantially semicircular configuration that can conform to hose 50. Trailing end 20 of first jaw 12 and leading end 22 of second jaw 14 form an s-curve configuration with a transitional or central portion 16. Note that the combination of jaw 12, central section 16, and jaw 14 define a common cylindrical section having an internal diameter substantially equal to the outer diameter of hose 50. Thus the jaws 12, 14 and the section 16 define a continuous spiralling but uninterrupted inner cylindrical surface 54 that completely surrounds and abuts the hose 50, beginning at edge 55 and terminating at edge 56.

Handle 30 has palm swell 32 and finger rests 34 which conform to the contours of the human hand to prevent handle 30 from slipping from the operator's hand as shown in phantom line 55 in FIG. 5. Hand guard 36 is connected to handle 30 by connector 38. Handle 30 and hand guard 36 are rigidly affixed to handle 30.

In the preferred embodiment of the present invention, hose gripper 10 is encapsulated with slip-resistant coating 40 of rubber or plastic for example to prevent inadvertent slippage of the gripper from the hose or from the operator's hand during use. (See FIG. 2)

What is claimed as the invention is:

1. A hand held gripper for high pressure hoses comprising:
   (a) a saddle having first and second opposed jaws laterally spaced apart from one another and interconnected by a transitional, center offset section and including an interior spiralling bearing surface that extends linearly along and circumferentially about, hose during use, the spiral defining a slot between the spaced jaws through which a section of hose can be inserted; and
   (b) a handle rigidly affixed to the saddle which allows an operator, such as a fireman, to grip and support the apparatus and a hose section contained therein.

2. The gripper of claim 1 further comprising an offset center section curved and spiralled downwardly between the first and second jaw, each jaw having a semi-circular configuration in order to register with and contact the top and bottom of the hose.

3. The gripper of claim 2 whereby the leading end of the first jaw and the trailing end of the second jaw have a substantially semi-circular configuration, while the trailing end of the first jaw and the leading end of the second jaw have an s-curve configuration.

4. The gripper of claim 1 whereby the combination of the first jaw, offset center section and second jaw define a common cylindrical section having
   (a) an internal diameter substantially equal to the outer diameter of the hose;
   (b) a continuous, spiralling, but uninterrupted inner cylindrical surface that completely surrounds and abuts the hose in either a pressurized or unpressurized state.

5. The gripper of claim 1 having a saddle of sufficient length to grip a substantial section of hose so that the operator can effectively counter the back pressure load of hose in a pressurized state.

6. The gripper of claim 1 encapsulated in slip-resistant material to prevent inadvertent slippage of the hose through the hose gripper or through the operator's hand during use.

7. The gripper of claim 1 further comprising a handle, having
   (a) forwardly extending hand guard;
   (b) palm swells;
   (c) finger rests; which give the operator a sure grip thereby increasing the operator's control of the hose and reducing the physical strain associated with controlling high pressure hoses.

8. The gripper of claim 7 having the handle affixed to the saddle in such a manner that the width of the handle does not exceed the width of the saddle thereby allowing the operator to use the gripper in close quarters.

9. The gripper of claim 7 having the handle affixed perpendicular to the horizontal of the upper surface of the first opposed jaw and positioned in such a manner that the operator can grip the handle in his hand while resting his forearm on the surface of the hose in order to exert downard pressure with his forearm to counter effectively the back pressure load of the hose in its pressurized state.

10. The gripper of claim 7 having the handle integrally constructed with the saddle so that the handle will not break away from the saddle during use.

* * * * *